United States Patent
Benthien et al.

(10) Patent No.: US 8,894,013 B2
(45) Date of Patent: Nov. 25, 2014

(54) AIRCRAFT ASSEMBLY AND METHOD FOR PRODUCING AN AIRCRAFT ASSEMBLY

(75) Inventors: Hermann Benthien, Sottrum (DE); Axel Soeffker, Sottrum (DE)

(73) Assignee: Airbus Operations GmbH, Hamburg (DE)

( * ) Notice: Subject to any disclaimer, the term of this patent is extended or adjusted under 35 U.S.C. 154(b) by 224 days.

(21) Appl. No.: 13/469,822

(22) Filed: May 11, 2012

(65) Prior Publication Data

US 2013/0125354 A1    May 23, 2013

Related U.S. Application Data

(60) Provisional application No. 61/485,668, filed on May 13, 2011.

(30) Foreign Application Priority Data

May 13, 2011    (DE) .......................... 10 2011 101 450

(51) Int. Cl.
*B64C 1/00* (2006.01)
*B29C 65/56* (2006.01)
(Continued)

(52) U.S. Cl.
CPC ................. *B64C 1/12* (2013.01); *B29C 65/562* (2013.01); *B29L 2031/3076* (2013.01); *A44B*
(Continued)

(58) Field of Classification Search
USPC ....................... 244/118.2, 119, 120, 131, 132
See application file for complete search history.

(56) References Cited

U.S. PATENT DOCUMENTS 4,759,812 A * 7/1988 Miller ............................. 156/98
6,124,015 A   9/2000 Baker et al.
(Continued)

FOREIGN PATENT DOCUMENTS

DE          3344995 A1   6/1985
DE   10 2004 001 078 A1   7/2005
(Continued)

*Primary Examiner* — Timothy D Collins
*Assistant Examiner* — Nicholas McFall
(74) *Attorney, Agent, or Firm* — Carter DeLuca Farrell & Schmidt LLP

(57) ABSTRACT

An aircraft assembly is provided having a first aircraft component and a second aircraft component, at least one of the aircraft components being composed of a fibre-reinforced composite material, a connecting device connecting the first aircraft component to the second aircraft component, the connecting device including a first and a second section having a carrier element connected to the first and second aircraft components respectively, the first section having a first surface facing the first aircraft component and a second surface facing away from the first aircraft components, the second section having a first surface facing the second aircraft component and a second surface facing away from the second aircraft component. The first and second sections include a plurality of hook and loop elements extending from the second surface of the carrier element and cooperate to produce a hook and loop connection between the first and second aircraft components.

22 Claims, 11 Drawing Sheets

(51) Int. Cl.
  *A44B 18/00*  (2006.01)
  *B29C 65/00*  (2006.01)
  *B64C 1/12*   (2006.01)
  *B29C 65/72*  (2006.01)
  *B29L 31/30*  (2006.01)
  *B29C 65/48*  (2006.01)
  *B29C 65/54*  (2006.01)
  *B29C 65/50*  (2006.01)

(52) U.S. Cl.
  CPC ... 18/0069 (2013.01); *B29C 66/524* (2013.01); *B29C 66/532* (2013.01); *B29C 66/721* (2013.01); *Y02T 50/43* (2013.01); *B29C 66/7212* (2013.01); *Y02T 50/433* (2013.01); *B29C 66/112* (2013.01); *B29C 65/4835* (2013.01); *B29C 66/1122* (2013.01); *B64C 2001/0072* (2013.01); *B29C 65/54* (2013.01); *B29C 66/73941* (2013.01); *B29C 65/5057* (2013.01); *B29C 66/131* (2013.01); *B29C 65/483* (2013.01); *B29C 66/61* (2013.01); *B29C 65/72* (2013.01)
  USPC ........................................................ 244/131

(56) References Cited

U.S. PATENT DOCUMENTS

2009/0243868 A1*  10/2009  Wentland et al. ............. 340/652
2010/0007056  A1    1/2010  Jacob et al.
2010/0236542 A1*   9/2010  Pierson et al. ................ 126/621

FOREIGN PATENT DOCUMENTS

DE      102004001078  A1   7/2005
DE      10 2007 062 111  A1   7/2009
DE      102007062111  A1   7/2009
DE      10 2008 032 834  A1   1/2010

* cited by examiner

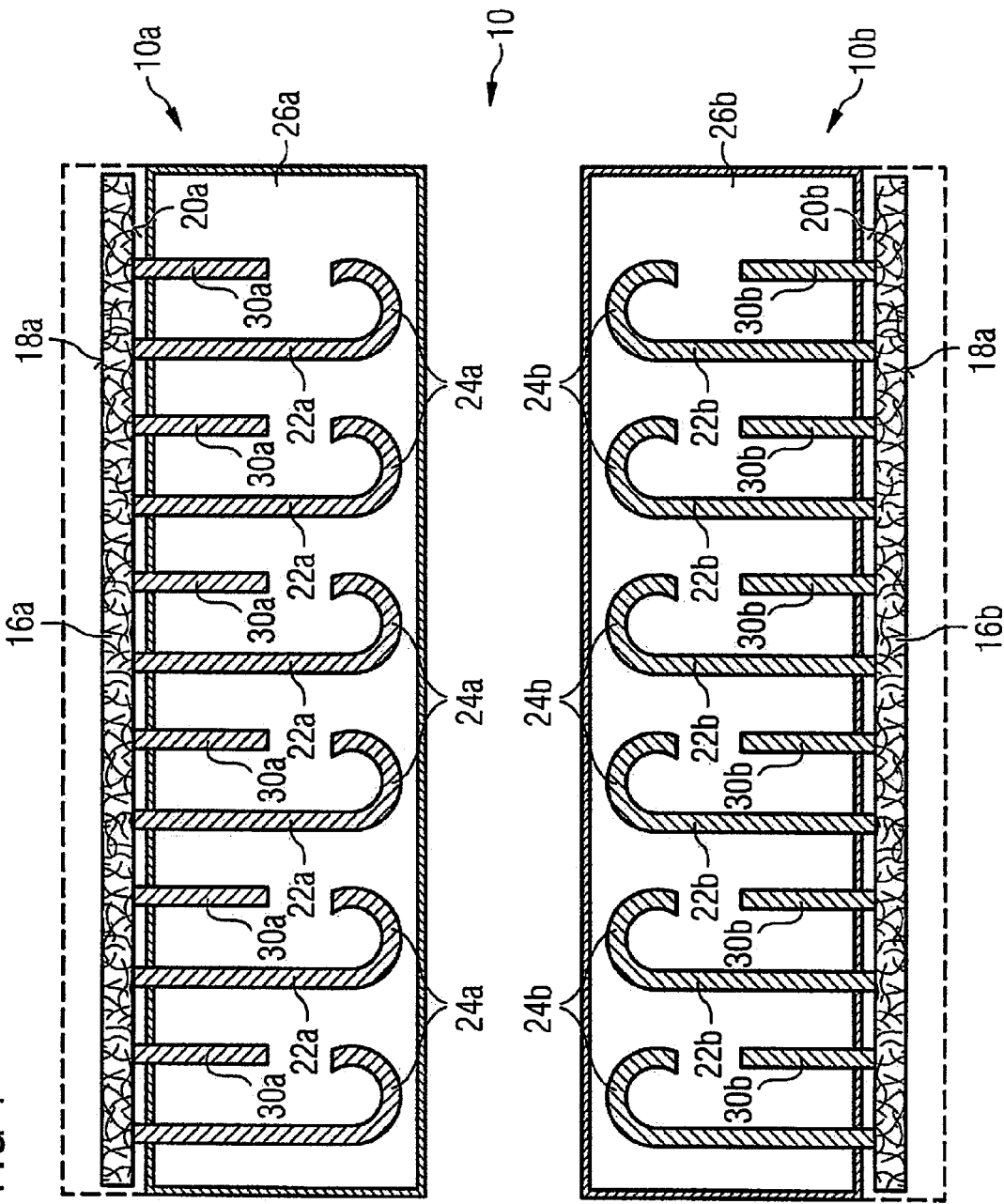

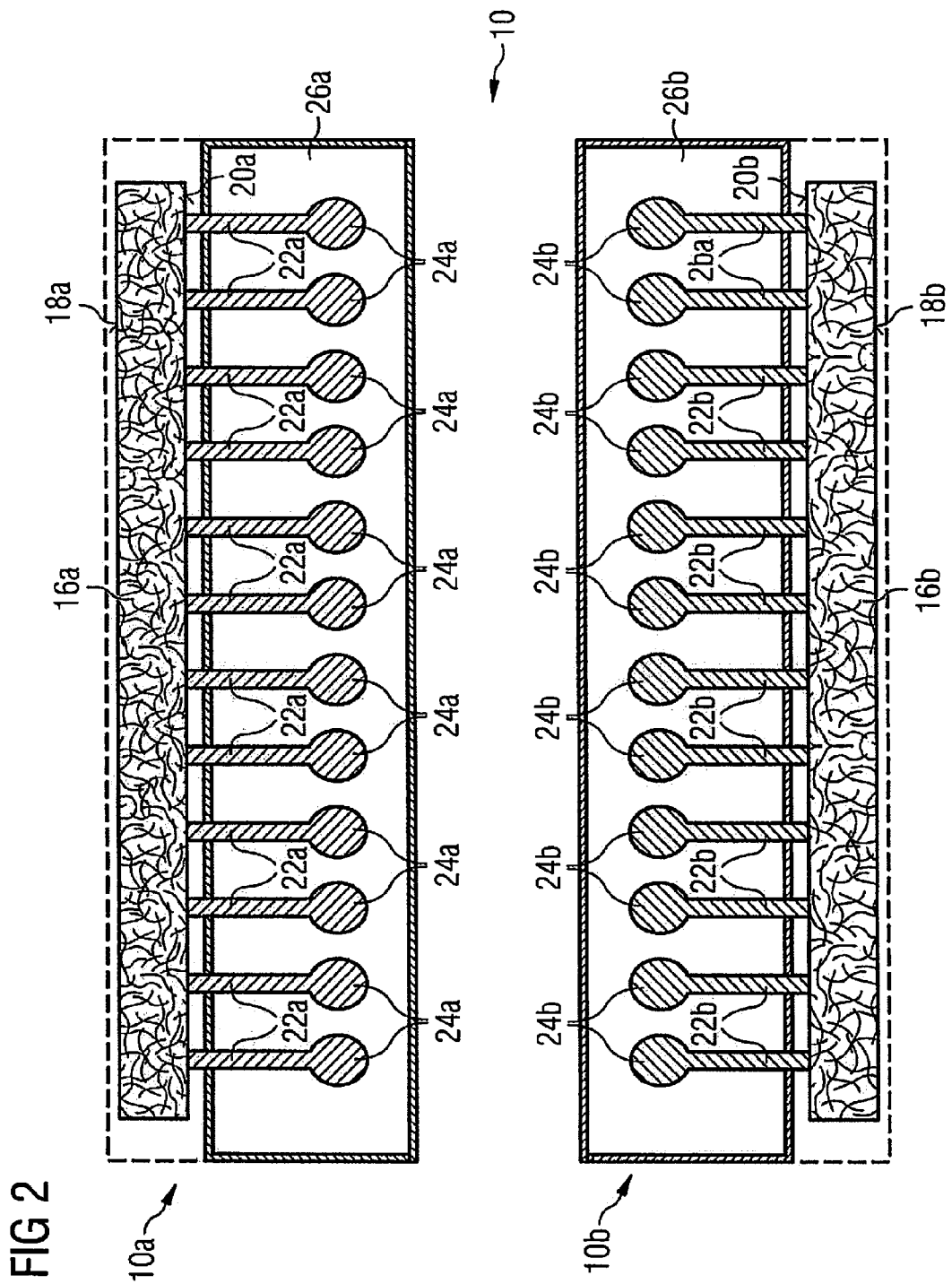

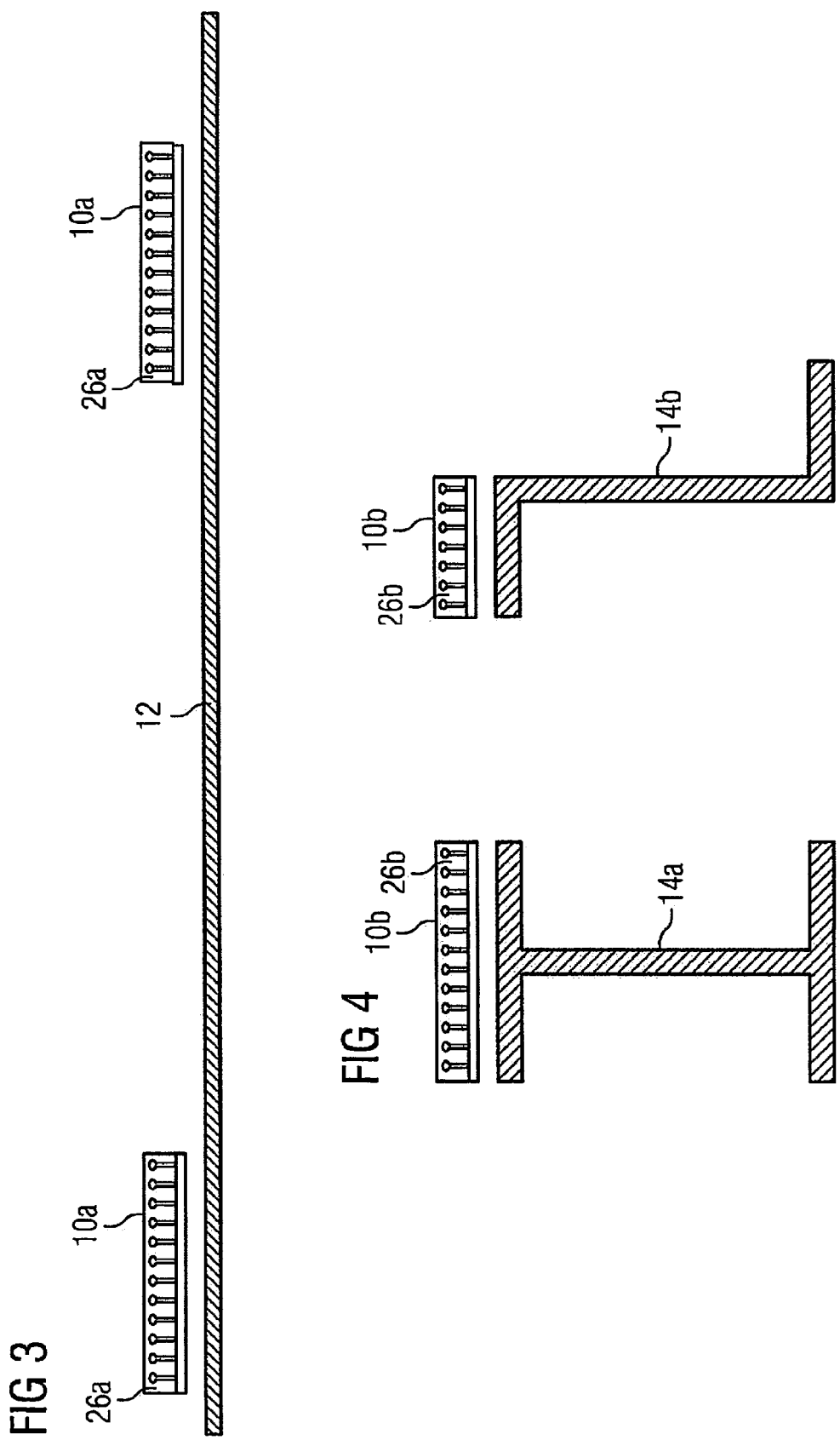

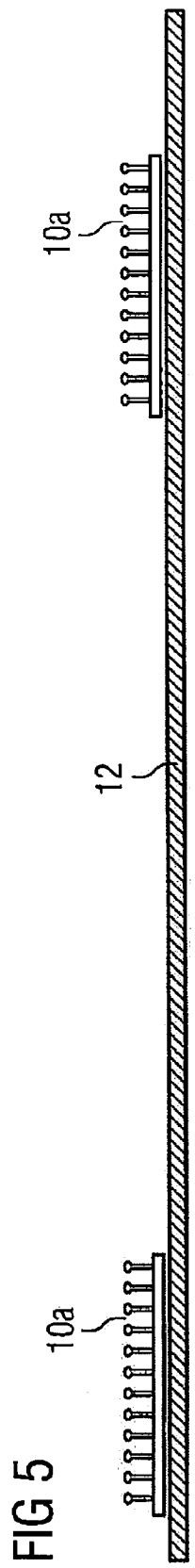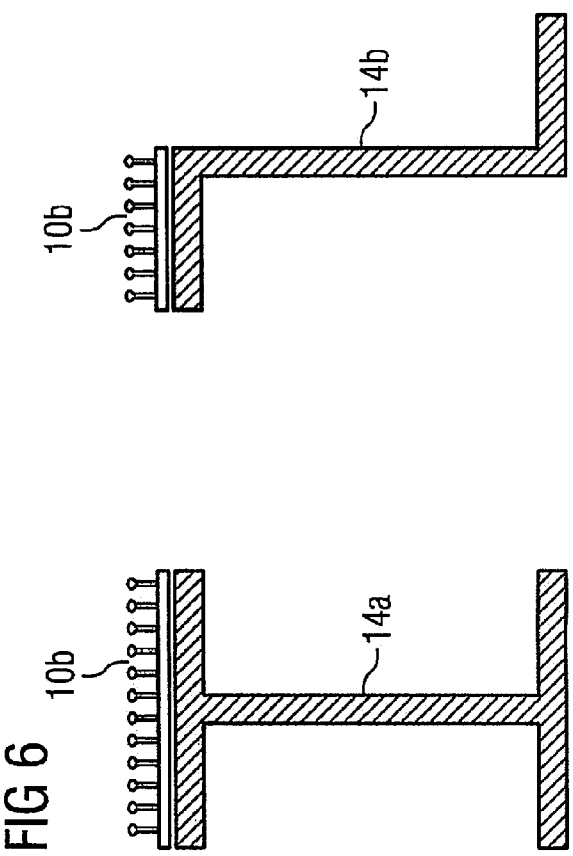

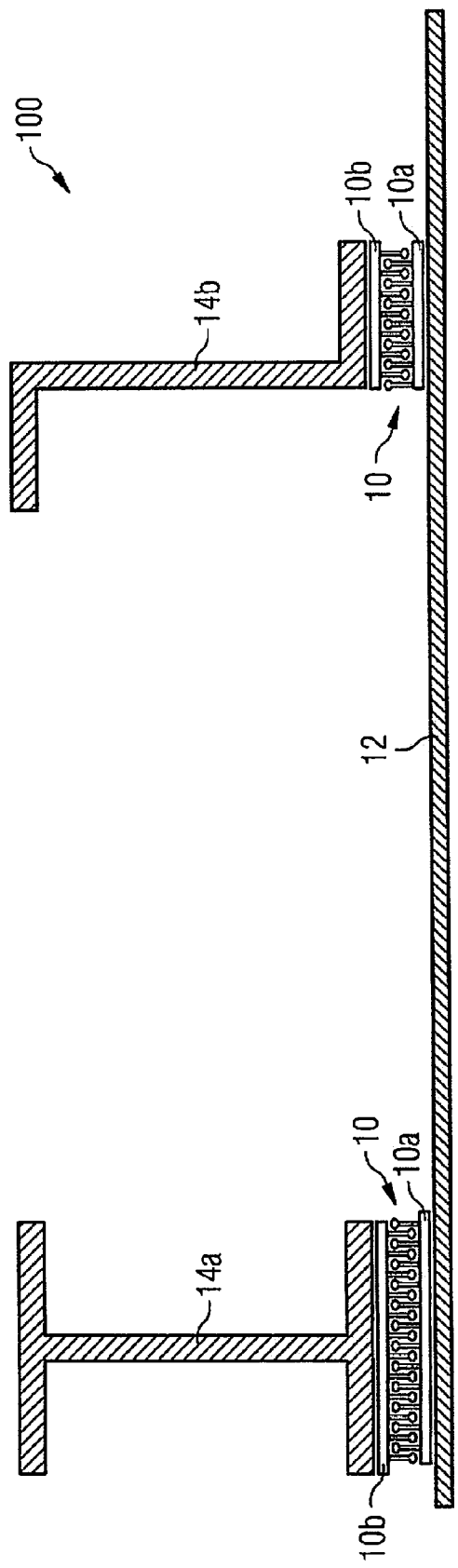

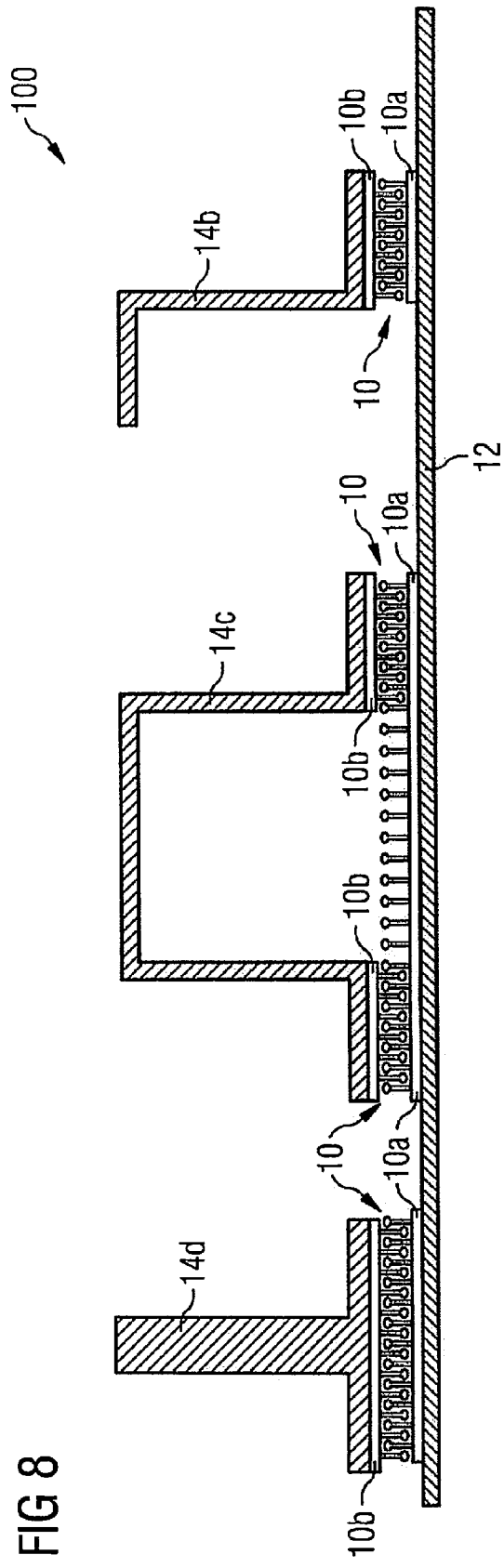

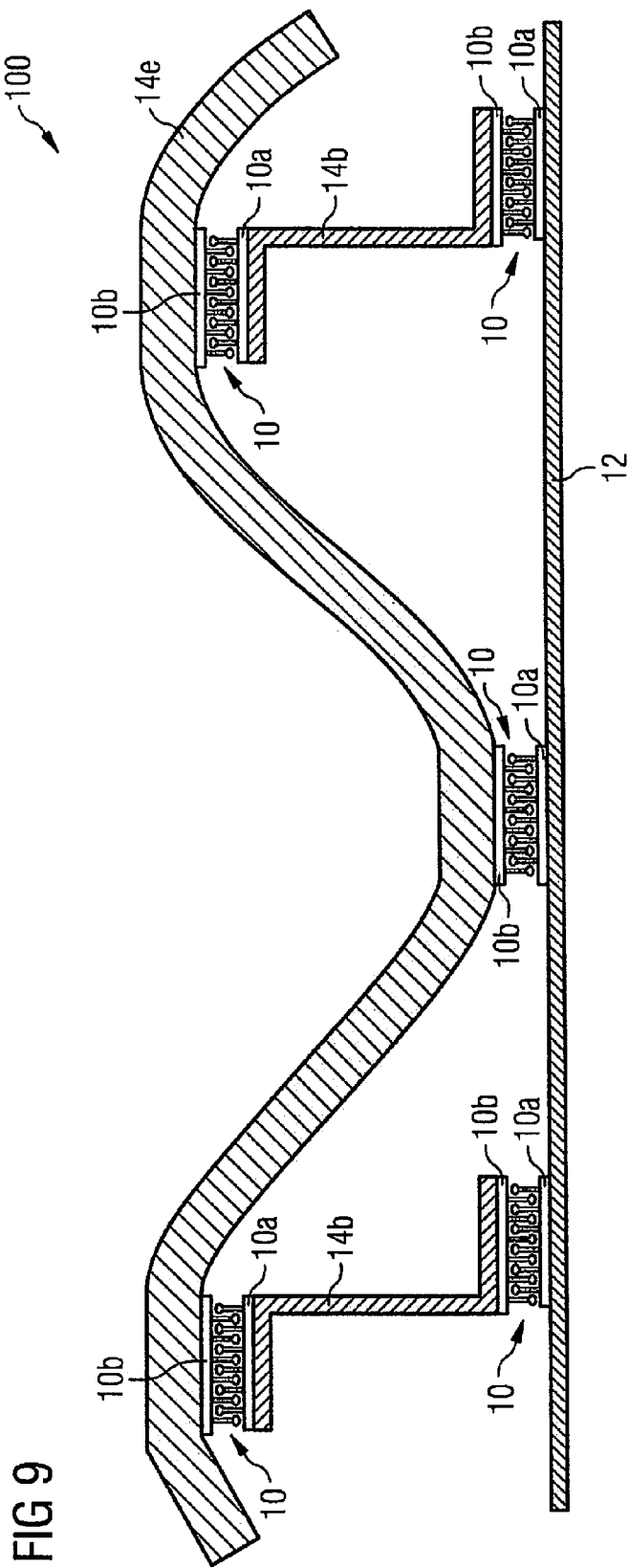

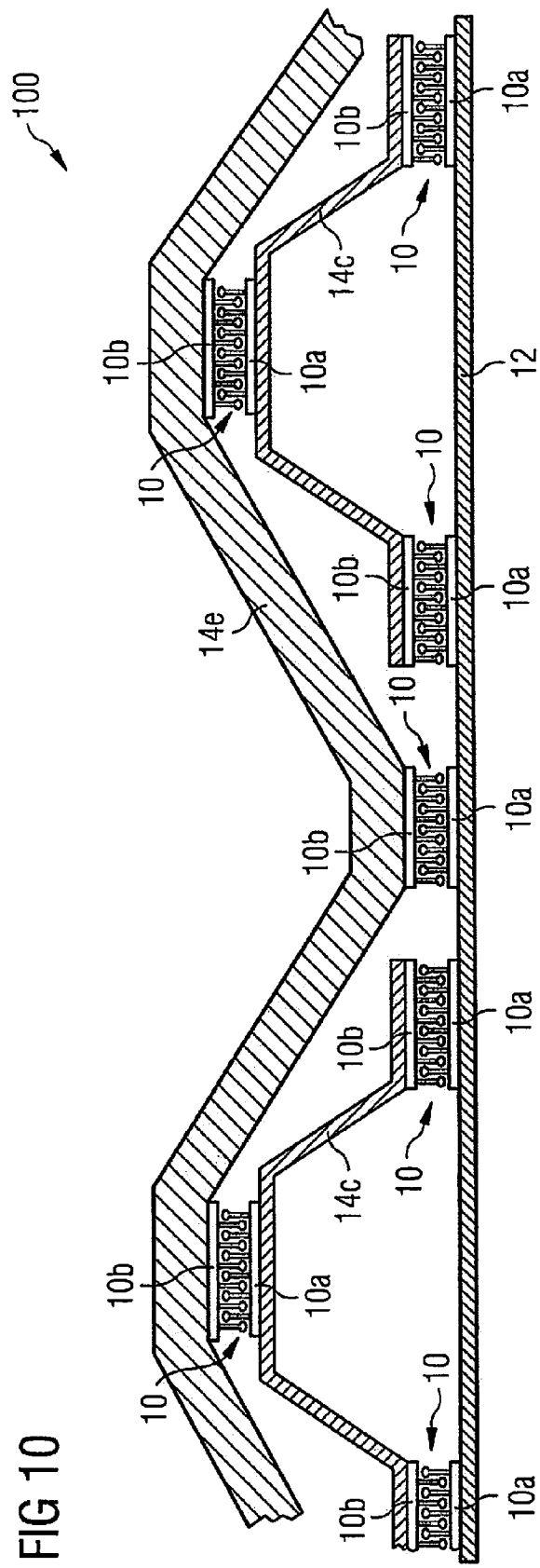

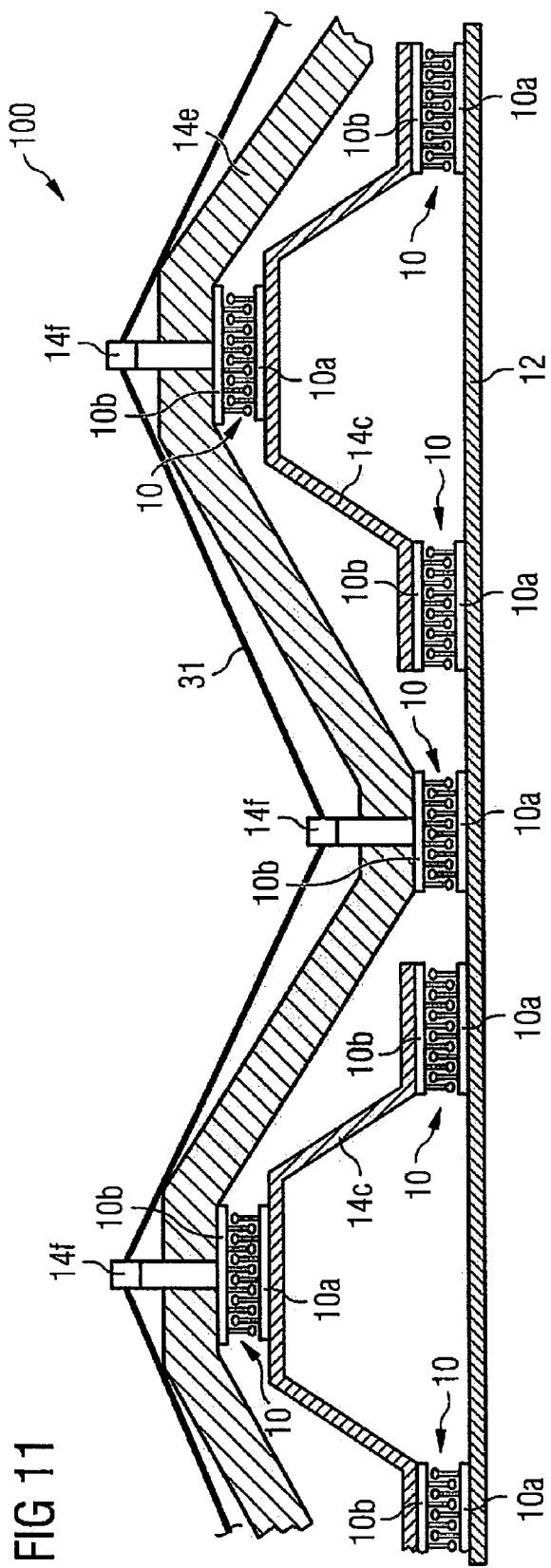

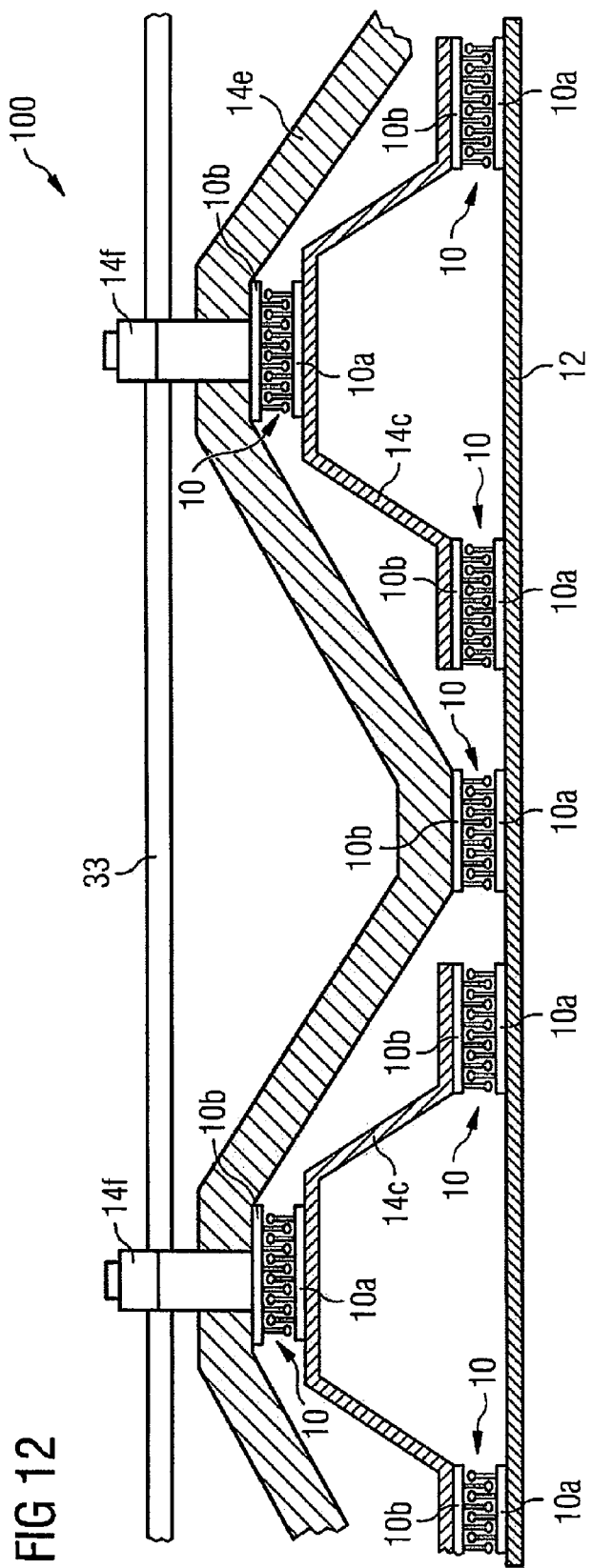

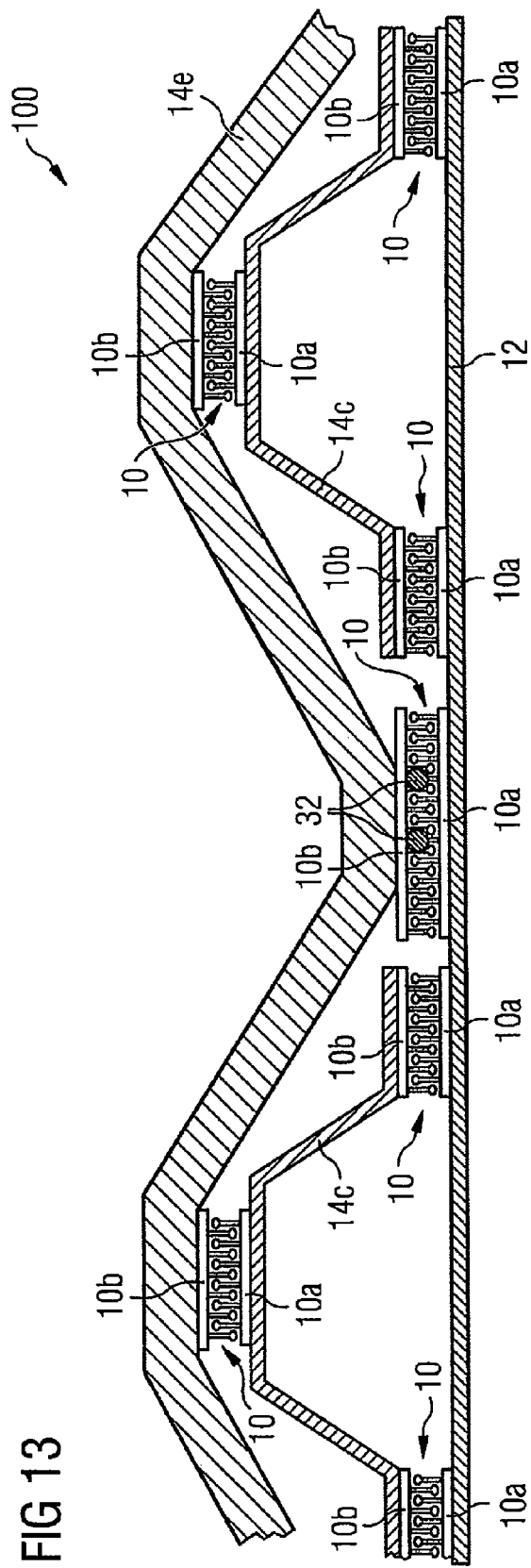

AIRCRAFT ASSEMBLY AND METHOD FOR PRODUCING AN AIRCRAFT ASSEMBLY

TECHNICAL FIELD

The invention relates to an aircraft assembly which comprises at least two aircraft components connected to one another, in particular two aircraft structural components. Furthermore, the invention relates to a method for producing such an aircraft assembly.

BACKGROUND

In aircraft construction, efforts are being made to use as load-bearing components increasingly components which are composed wholly or partly of fibre-reinforced composite materials, for example carbon fibre-reinforced plastics (CFRP). For example, DE 10 2007 062 111 A1 describes a transverse support structure which is composed of carbon fibre-reinforced plastic and serves to support the individual panels of an aircraft floor system for separating a passenger cabin from a cargo compartment arranged below the passenger cabin. Furthermore, it is known, for example from DE 10 2004 001 078 A1, to provide aircraft fuselage segments with a skin which is designed with a sandwich construction and made of fibre-reinforced composite materials. Finally, DE 10 2008 032 834 A1 relates to a stiffening component composed of a fibre-reinforced composite material and configured in the form of an omega stringer.

To produce aircraft structural components from fibre-reinforced composite materials, as a rule a multilayer laminate is firstly built up from fibre prepregs. The fibre prepregs comprise a woven fabric or laid scrim of reinforcing fibres provided with a surface layer made of an uncured, thermoset plastic material, for example an epoxy resin material. The laminate can be built up manually or in an automated manner. Subsequently, the thermoset plastic material deposited on the surfaces of the fibres is cured in an autoclave cycle under pressure and/or elevated temperature, so that a composite material with a matrix made of a cured thermoset plastic and reinforcing fibres embedded in the matrix is obtained. To connect two aircraft structural components composed of fibre-reinforced composite materials, adhesively bonded connections may be used. Alternatively to this, in order to create a particularly stable laminate connection, the components may be brought into contact with one another in the uncured state and subsequently jointly cured.

SUMMARY

The invention is directed at the object of providing an aircraft assembly having at least two aircraft components which are composed of a fibre-reinforced composite material and are connected to one another by a peeling-stress-resistant connection. Furthermore, the invention is directed at the object of specifying a method for producing such an aircraft assembly.

This object is achieved by an aircraft assembly having the features of Claim 1 and a method for producing an aircraft assembly having the features of Claim 8.

An aircraft assembly according to the invention comprises a first aircraft component and a second aircraft component. At least one of the aircraft components is composed of a fibre-reinforced composite material. Preferably, both aircraft components are composed of a fibre-reinforced composite material. The aircraft component(s) of the aircraft assembly according to the invention may contain reinforcing fibres made of carbon which are present as short fibres or continuous fibres in the form of laid scrims or woven fabrics. Furthermore, other suitable fibres, such as, for example, glass fibres, may also be used. The aircraft components of the aircraft assembly according to the invention are preferably aircraft structural components which are subjected to corresponding loads during operation. An aircraft component installed in the aircraft assembly according to the invention may be, for example, an aircraft outer skin section, a frame or a stringer. The aircraft assembly according to the invention may, however, also comprise other aircraft components, such as, for example, a section of primary insulation of an aircraft. The first and the second aircraft component of the aircraft assembly according to the invention are connected to one another by means of a connecting device.

The connecting device comprises a first section which comprises a carrier element connected to the first aircraft component. The carrier element has a first surface facing the first aircraft component and a second surface facing away from the first aircraft component. The first section of the connecting device furthermore comprises a plurality of hook and loop elements which extend from the second surface of the carrier element and may each have a hook and loop head at their free ends facing away from the second surface of the carrier element. Furthermore, the connecting device comprises a second section which comprises a carrier element connected to the second aircraft component and having a first surface facing the second aircraft component and a second surface facing away from the second aircraft component. Furthermore, the second section of the connecting device comprises a plurality of hook and loop elements which extend from the second surface of the carrier element and may each have a hook and loop head at their free ends facing away from the second surface of the carrier element.

Preferably, two large-area main surfaces of the carrier elements serve as the first and second surface. In other words, preferably the carrier elements are of planar form, i.e. comparatively thin in relation to the area of their first and second surfaces, so that the first and the second surface of the carrier elements are each at a comparatively short distance from one another.

The shape of the carrier elements may be adapted to the respective intended use of the connecting device sections. For example, a ribbon-shaped, but also a large-area, round, angular or other configuration of the carrier elements is conceivable.

The hook and loop elements of the first and the second section of the connecting device cooperate with one another in the aircraft assembly according to the invention to produce a hook and loop connection between the first and the second aircraft component. In other words, the hook and loop elements and in particular the hook and loop heads of the hook and loop elements are designed such that the hook and loop elements of the first section of the connecting device can engage with the hook and loop elements of the second section of the connecting device in such a manner that a secure connection of the first section of the connecting device to the second section of the connecting device and hence of the first aircraft component to the second aircraft component is made possible.

The two aircraft components which are connected to one another by means of the connecting device by a hook and loop connection may be two aircraft components formed separately from one another. Alternatively to this, however, the connecting device may also be used to connect two sections of merely one aircraft component to one another. Finally, the connecting device may serve to close cuts or slits made in an aircraft component. The formulations "first aircraft component" and "second aircraft component" in the context of this application thus refer not only to two aircraft components formed separately from one another, but also different sections of merely one aircraft component.

The hook and loop elements of the first and the second section of the connecting device create, in the region of the interface between the two aircraft components or aircraft component sections, a direct unyielding load path via which stresses acting on the aircraft components or aircraft component sections can be carried away. Through the hook and loop elements of the first and the second section of the connecting device, the interface between the two aircraft components is thus endowed with a markedly higher rigidity than a pure s adhesively bonded connection or a connection produced by joint curing of aircraft components composed of a fibre-reinforced composite material. An interface produced by means of the connecting device between two aircraft components or two aircraft component sections in the aircraft assembly according to the invention is therefore particularly peeling-stress-resistant. Consequently, the aircraft assembly according to the invention is distinguished by increased failure resistance.

The hook and loop elements of the first section of the connecting device may extend substantially perpendicularly to the second surface of the carrier element of the first section of the connecting device. Alternatively or additionally to this, the hook and loop elements of the second section of the connecting device may extend substantially perpendicularly to the second surface of the carrier element of the second section of the connecting device. Alternatively to this, however, it is also conceivable to orient the hook and loop elements of the first and/or the second section of the connecting device at an angle <90° relative to the second surface of the carrier element of the first and/or the second section of the connecting device.

At least some of the hook and loop heads of the hook and loop elements of the first and/or the second section of the connecting device may be of hooked configuration. Hook and loop elements with a hooked hook and loop head may thus comprise a substantially pin-shaped section extending from the second surface of the carrier element of the first and/or the second section of the connecting device. This pin-shaped section may be formed integrally with the hooked hook and loop head. A free end of the hooked hook and loop head preferably faces the second surface of the carrier element of the first and/or the second section of the connecting device. Hooked hook and loop heads can be interlocked with one another in a simple and convenient manner. A particularly secure connection between the two sections of the connecting device and hence the aircraft components or aircraft component sections of the aircraft assembly according to the invention is thereby created. Depending on the intended use of the connecting device and the configuration of the aircraft components or aircraft component sections to be connected to another, the free ends of the hooked hook and loop heads may be of pointed or blunted design.

In an alternative embodiment of the aircraft assembly according to the invention, at least some of the hook and loop elements of the first and/or the second section of the connecting device may be provided with hook and loop heads of spherical, ellipsoidal or cuboidal form. The first and/or the second section of the connecting device may, of course, comprise hook and loop elements with different hook and loop heads, as required. For example, some of the hook and loop elements may have hooked hook and loop heads and some of the hook and loop elements may have spherical, ellipsoidal or cuboidal hook and loop heads.

The first and/or the second section of the connecting device may furthermore comprise a plurality of securing elements. Preferably, each securing element is assigned to a hook and loop element and extends adjacently to the hook and loop element from the second surface of the carrier element of the first or the second section of the connecting device. Preferably, the hook and loop element and the securing element assigned to the hook and loop element are oriented parallel to one another. Free ends of the securing elements facing away from the second surface of the carrier element of the first and/or the second section of the connecting device are preferably each arranged at a shorter distance from the second surface of the carrier element than the hook and loop head of the hook and loop element. The hook and loop heads of the interlocked hook and loop elements are kept in connection with one another by the securing elements. In other words, the securing elements prevent the hook and loop elements from disengaging when loads act on the aircraft components. The securing elements thus make it possible to strengthen a hook and loop connection, produced by means of the connecting device, between the aircraft components or the aircraft component sections of the aircraft assembly according to the invention.

Securing elements assigned to a hook and loop element with a spherical, ellipsoidal or cuboidal hook and loop head may be arranged, in principle, at any desired position along a circular line around the hook and loop element adjacently to the hook and loop element. Securing elements assigned to a hook and loop element equipped with a hooked hook and is loop head, by contrast, are preferably positioned in such a manner adjacently to the hook and loop element, i.e. they extend preferably in such a manner adjacently to the hook and loop element from the second surface of the carrier element, that free ends of the securing elements facing away from the second surface of the carrier element are each located opposite the free ends of the hooked hook and loop heads of the hook and loop elements. The distance between the free end of a securing element and the hook and loop head of a hook and loop element should in this case be large enough to allow a hook and loop element provided for cooperating with the hook and loop element to be passed through between the free end of the securing element and the hook and loop head.

The carrier element of the first section of the connecting device is preferably composed of a fibre-reinforced composite material. Alternatively or additionally to this, the carrier element of the second section of the connecting device may also be composed of a fibre-reinforced composite material. The carrier element of the first section of the connecting device and/or the carrier element of the second section of the connecting device may comprise a woven fabric or a laid scrim of reinforcing fibres which may be present in the form of short fibres or continuous fibres and may be carbon fibres, but also other suitable fibres, such as, for example, glass fibres. The fibres may be embedded in a matrix made of a plastic material, for example a thermoset plastic material, in particular an epoxy resin material. Preferably, the matrix of the carrier element of the first section of the connecting device is composed of the same material as the matrix of the first aircraft component. Similarly, the matrix of the carrier element of the second section of the connecting device may be composed of the same material as the matrix of the second aircraft component. If desired, fibres made of the same material may also be contained in the sections of the connecting device and the associated aircraft components, i.e. the carrier element of the first section of the connecting device may be composed of the same fibre-reinforced composite material as the first aircraft component. Alternatively or additionally to this, the carrier element of the second section of the connecting device may be made of the same fibre-reinforced composite material as the second aircraft component.

A fibre prepreg whose reinforcing fibres are provided with a surface layer made of an uncured plastic material may be used as the starting material of the carrier element of the first section of the connecting device. The carrier element may then be connected to the first aircraft component by curing, whereby more or less an integration of the carrier element into the aircraft component material takes place. Similarly, the carrier element of the second section of the connecting device may also be connected to the second aircraft component by joint curing of a fibre prepreg. The curing may take place, if required, under elevated temperature and/or under elevated pressure, optionally also in an autoclave.

The hook and loop elements and/or the securing elements of the first and/or the second section of the connecting device may be composed of a fibre material. For example, the hook and loop elements and/or the securing elements may be produced from carbon fibres, but also from other suitable fibres, such as, for example, glass fibres. Expediently, the hook and loop elements and/or the securing elements are produced from fibres which are composed of the same material as the fibres integrated into the carrier elements of the first and/or the second section of the connecting device and/or the aircraft components which are provided for connection to the first and/or the second section of the connecting device. Particularly if the aircraft components are subjected to a curing cycle together with the first and/or the second section of the connecting device, an optimal integration of the first and/or the second section of the connecting device into the aircraft components is then ensured.

Preferably, the hook and loop elements and/or the securing elements of the first and/or the second section of the connecting device are composed of an electrically conductive material. Conductive materials suitable for producing the hook and loop elements and/or the securing elements are, for example, carbon fibres or metal. The hook and loop elements and/or the securing elements then create an electrically conductive connection between the aircraft components connected to one another by means of the connecting device. This ensures an electrical earth connection between the aircraft components. Moreover, hook and loop elements and/or securing elements composed of an electrically conductive material may also be used for inductively heating resin material surrounding the hook and loop elements and/or the securing elements, in the course of a curing process.

Interspaces present between the hook and loop elements of the first section of the connecting device and the hook and loop elements of the second section of the connecting device may be filled with a sealing material in the aircraft assembly according to the invention. The sealing material may, for example, be a resin, in particular a curable resin. The introduction of a sealing material, in particular a curable resin, into interspaces present between the hook and loop elements of the first section of the connecting device and the hook and loop elements of to the second section of the connection enables consolidation and strengthening of the connection between the hook and loop elements and hence the two sections of the connecting device. A further strengthening of this connection is made possible by curing the resin introduced into the interspaces between the hook and loop elements. The curing of the resin may take place, if required, under elevated temperature and/or under elevated pressure, optionally also in an autoclave.

In a further embodiment of the aircraft assembly according to the invention, cables are arranged in interspaces present between the hook and loop elements of the first section of the connecting device and the hook and loop elements of the second section of the connecting device. Continuous, abrasion-free cable fixing becomes possible by arranging the cables between the hook and loop elements of the two sections of the connecting device. Moreover, the incorporation of the cables into the connecting device enables dissipation of heat from the cables. If it is required to remove large quantities of heat from cables integrated into the connecting device, the sections of the connecting device are preferably composed of a material of good thermal conductivity.

In a method according to the invention for producing an aircraft assembly, a first aircraft component is connected in such a manner to a carrier element of a first section of a connecting device that a first surface of the carrier element faces the first aircraft component and a second surface of the carrier element faces away from the first aircraft component, a plurality of hook and loop elements extending from the second surface of the carrier element, which hook and loop elements may each have a hook and loop head at their free ends. Furthermore, a second aircraft component is connected in such a manner to a carrier element of a second section of the connecting device that a first surface of the carrier element faces the second aircraft component and a second surface of the carrier element faces away from the second aircraft component, a plurality of hook and loop elements extending from the second surface of the carrier element, which hook and loop elements may each have a hook and loop head at their free ends. At least one of the aircraft components is composed of a fibre-reinforced composite material. Finally, a hook and loop connection between the first and the second aircraft component is produced by engaging the hook and loop elements of the first and the second section of the connecting device with one another.

A peeling-stress-resistant connection between two aircraft components is produced by the method according to the invention. Furthermore, the method allows simple, quick and hence cost-effective assembly of the aircraft components.

Preferably, the carrier element of the first section of the connecting device is produced from a fibre prepreg. The fibres of the fibre prepreg may be coated with a plastic material, which also forms the matrix of the first aircraft component. The fibres contained in the fibre prepreg may also be composed of the same material as the reinforcing fibres of the first aircraft component.

Alternatively or additionally to this, the carrier element of the second section of the connecting device may be produced from a fibre prepreg. The fibres of the fibre prepreg may be coated with a plastic material, which also forms the matrix of the second aircraft component. The fibres contained in the fibre prepreg may also be composed of the same material as the reinforcing fibres of the second aircraft component. Preferably, the fibre prepreg(s) which is/are used to produce the carrier element of the first section of the connecting device and/or the carrier element of the second section of the connecting device has/have a certain flexibility, so that the carrier element(s) is/are also suitable for cooperating with a curved surface of an aircraft component or aircraft component section to be connected to the carrier element(s).

The carrier element of the first section of the connecting device may be brought into contact in the uncured state with the first aircraft component likewise in the uncured state and the connection between the carrier element of the first section of the connecting device and the first aircraft component may be produced by joint curing of the carrier element of the first section of the connecting device and of the first aircraft component. The curing process may take place optionally under elevated pressure and/or under elevated temperature, in dependence on the plastic material contained in the carrier element and/or the aircraft component. If required, the curing process may also be carried out in an autoclave. Similarly, the carrier element of the second section of the connecting device may be brought into contact in the uncured state with the second aircraft component likewise in the uncured state and the connection between the carrier element of the second section of the connecting device and the second aircraft component may be produced by joint cold- or hot-curing of the carrier element of the second section of the connecting device and of the second aircraft component.

Interspaces present between the hook and loop elements of the first section of the connecting device and the hook and loop elements of the second section of the connecting device may be filled with a sealing material. The sealing material used may, for example, be a resin, in particular a curable resin. Curing of this resin in a cold- or hot-curing process is possible if a particularly load-resistant connection between the two sections of the connecting device and hence the two aircraft components or aircraft component sections is required.

Cables may be laid in interspaces present between the hook and loop elements of the first section of the connecting device and the hook and loop elements of the second section of the connecting device.

A mould made of a water-soluble material may be used to produce the first and/or the second section of the connecting device. Soap, special plaster or the like may be used, for example, as the water-soluble material. The carrier element composed, for example, of a fibre prepreg may be introduced into the mould. The hook and loop elements may be produced by infiltration of the mould.

The mould used for production the first and/or the second section of the connecting device is preferably only washed off after the first section of the connecting device has been connected to the first aircraft component and/or the second section of the connecting device has been connected to the second aircraft component. This facilitates the handling of the two sections of the connecting device during the connection to the corresponding aircraft components of aircraft component sections.

BRIEF DESCRIPTION OF THE DRAWINGS

Preferred embodiments of the invention will now be explained in more detail with the aid of the appended, schematic drawings, of which:

FIG. 1 shows a first embodiment of a connecting device for producing a peeling-stress-resistant connection between two aircraft components;

FIG. 2 shows a second embodiment of a connecting device for producing a peeling-stress-resistant connection between two aircraft components;

FIG. 3 shows the connection of two connecting device sections according to FIG. 2 to a first aircraft component;

FIG. 4 shows the connection of two connecting device sections according to FIG. 2 to two second aircraft components;

FIG. 5 shows the first aircraft component according to FIG. 3 connected to the connecting device sections after a water-soluble mould used to produce the connecting device sections has been washed off;

FIG. 6 shows the second aircraft components according to FIG. 4 connected to the connecting device sections after a water-soluble mould used to produce the connecting device sections has been washed off;

FIG. 7 shows an aircraft assembly consisting of the first aircraft component according to FIG. 5 and the two second aircraft components according to FIG. 6;

FIG. 8 shows a further embodiment of an aircraft assembly;

FIG. 9 shows a still further embodiment of an aircraft assembly;

FIG. 10 shows a still further embodiment of an aircraft assembly;

FIG. 11 shows a still further embodiment of an aircraft assembly;

FIG. 12 shows a still further embodiment of an aircraft assembly; and

FIG. 13 shows a still further embodiment of an aircraft assembly.

DETAILED DESCRIPTION

FIGS. 1 and 2 show two embodiments of a connecting device 10 which is suitable for producing a peeling-stress-resistant hook and loop connection between two aircraft components 12, 14a-f (see FIGS. 7 to 13) or two aircraft component sections. The connecting device 10 comprises a first section 10a and a second section 10b. Each section 10a, 10b of the connecting device 10 comprises a carrier element 16a, 16b having a first surface 18a, 18b and a second surface 20a, 20b located opposite the first surface 18a, 18b. The carrier elements 16a, 16b are produced from fibre prepregs which each comprise a woven fabric or laid scrim of reinforcing fibres provided with a surface layer made of an uncured, thermoset plastic material, for example an epoxy resin material.

The connecting device sections 10a, 10b furthermore comprise a plurality of hook and loop elements 22a, 22b which each extend from the second surface 20a, 20b of the carrier elements 16a, 16b. The hook and loop elements 22a, 22b are composed of an electrically conductive material, for example carbon fibres or a metal. At ends facing away from the second surface 20a, 20b of the carrier elements 16a, 16b, the hook and loop elements 22a, 22b each have a hook and loop head 24a, 24b. As shown in FIGS. 7 to 13, the hook and loop elements 22a of the first section 10a of the connecting device 10 are designed to interlock with the hook and loop elements 22b of the second section 10b of the connecting device 10, i.e. form a hook and loop connection.

To produce the first and the second section 10a, 10b of the connecting device 10, in each case a fibre prepreg used to produce the carrier elements 16a, 16b is introduced into a mould 26a, 26b made of a water-soluble material, such as, for example, soap or plaster. Subsequently, the mould 26a, 26b is infiltrated with the material used to form the hook and loop elements 22a, 22b. The hook and loop elements 22a, 22b extend substantially perpendicularly to the second surface 20a, 20b of the carrier elements 16a, 16b from the second surface 20a, 20b of the carrier elements 16a, 16b.

In the embodiment of a connecting device 10 illustrated in FIG. 1, the hook and loop heads 24a, 24b of the hook and loop elements 22a, 22b are of hooked configuration, i.e. the hook and loop elements 22a, 22b each comprise a section which extends from the second surface 20a, 20b of the carrier elements 16a, 16b and is adjoined by a curved hooked hook and loop head 24a, 24b. A free end of the hooked hook and loop head 24a, 24b, which may be of blunted or pointed configuration as required, faces the second surface 20a, 20b of the carrier elements 16a, 16b. Furthermore, besides hook and loop elements 22a, 22b, the connecting device 10 illustrated in FIG. 1 comprises additional securing elements 30a, 30b. The securing elements 30a, 30b are of pin-shaped configuration and are composed of the same material as the hook and loop elements 22a, 22b. Each securing element 30a, 30b is assigned to a hook and loop element 22a, 22b and extends adjacently to the hook and loop element 22a, 22b parallel to the hook and loop element 22a, 22b from the second surface 20a, 20b of the carrier elements 16a, 16b.

Ends of the securing elements 30a, 30b facing away from the second surface 20a, 20b of the carrier elements 16a, 16b are each arranged at a shorter distance from the second surface 20a, 20b of the carrier elements 16a, 16b than the hook and loop head 24a, 24b of the hook and loop elements 22a, 22b. In other words, the extension of the securing elements 30a, 30b perpendicularly to the second surface 20a, 20b of the carrier elements 16a, 16b is shorter than the extension of the hook and loop elements 22a, 22b perpendicularly to the second surface 20a, 20b of the carrier elements 16a, 16b. In particular, the securing elements 30a, 30b are each arranged in such a manner adjacently to a hook and loop element 22a, 22b that the free end of the securing elements 30a, 30b facing away from the second surface 20a, 20b of the carrier elements 16a, 16b is located opposite the free end of the hooked hook and loop head 24a, 24b of the hook and loop element 22a, 22b facing the second surface 20a, 20b of the carrier elements 16a, 16b.

The distance between the free end of the securing elements 30a, 30b and the free end of the hooked hook and loop heads 24a, 24b is in each case chosen such that a hook and loop element 22b, 22a provided for cooperating with a hook and loop element 22a, 22b can be passed through the gap formed between the free end of a securing element 30a, 30b and the free end of a hook and loop head 24a, 24b. However, the securing elements 30a, 30b prevent interlocked hook and loop elements 22a, 22b from disengaging when corresponding loads act on the aircraft components 12, 14a-f.

FIG. 2, by contrast, shows a connecting device 10 in which the hook and loop elements 22a, 22b are provided with spherical hook and loop heads 24a, 24b. A connecting device 10, shown in FIG. 2, in which the hook and loop elements 22a, 22b are provided with spherical hook and loop heads 24a, 24b may also comprise additional securing elements, described above in relation to an arrangement with hooked hook and loop heads. In other respects, the construction and functioning of the connecting device 10 according to FIG. 2 correspond to the construction and functioning of the connecting device 10 illustrated in FIG. 1.

As shown in FIG. 3, the first section 10a of the connecting device 10 is connected to the first aircraft component 12 before the mould 26a used to produce the first section 10a of the connecting device 10 is washed off. Similarly, the second section 10b of the connecting device 10 is connected to a second aircraft component 14a-b before the mould 26b used to produce the second section 10b of the connecting device 10 is washed off, see FIG. 4. The connection of the connecting device sections 10a, 10b to the first or the second aircraft component 12, 14a-b may, in principle, be effected by adhesive bonding. However, a particularly secure connection between the connecting device sections 10a, 10b and the first or the second aircraft component 12, 14a-b is achieved by joint curing of the connecting device sections 10a, 10b with the aircraft components 12, 14a-b.

In the configurations shown in FIGS. 3 to 8, the aircraft components 12, 14a-d contain fibres made of carbon which are embedded in a matrix made of a thermoset plastic. If the hook and loop elements 22a, 22b of the connecting device 10 are composed of a fibre material, the fibre material used to produce the hook and loop elements 22a, 22b is preferably identical to the fibre material used to produce the fibres of the aircraft components 12, 14a-d. Moreover, the material which is deposited as a surface layer on the reinforcing fibres of the fibre prepregs used to produce the carrier elements 16a, 16b preferably corresponds to the plastic material which forms the matrix in the aircraft components 12, 14a-d.

To connect the connecting device sections 10a, 10b to the aircraft components 12, 14a-d, a connecting device section 10a, 10b whose carrier element 16a, 16b is in an uncured state is to brought into contact with the aircraft component 12, 14a-d likewise in an uncured state. Subsequently, the connecting device sections 10a, 10b are subjected together with the aircraft components 12, 14a-d to a curing process which may take place also under elevated pressure and/or elevated temperature in an autoclave, in dependence on the plastic material contained in the carrier elements 16a, 16b and the plastic material forming the matrix of the aircraft components 12, 14a-d.

After the connection of the connecting device sections 10a, 10b to the aircraft components 12, 14a-d, the mould 26a, 26b composed of a water-soluble material is washed off the connecting device sections 10a, 10b, so that the hook and loop elements 22a, 22b of the connecting device sections 10a, 10b, as shown in FIGS. 5 and 6, extend freely from the second surface 20a, 20b of the carrier elements 16a, 16b of the connecting device sections 10a, 10b.

As shown in FIG. 7, an aircraft assembly 100 which comprises the first aircraft component 12 and two second aircraft components 14a-b is assembled by producing a hook and loop connection between the aircraft components 12, 14a-b by bringing the hook and loop elements 22a, 22b of the connecting device sections 10a, 10b into engagement with one another. If the aircraft assembly 100 is not subjected to high mechanical loads, the hook and loop connection produced by the connecting device 10 may already be sufficiently stable. With more highly loaded aircraft assemblies 100, interspaces present between the hook and loop elements 22a of the first section 10a of the connecting device 10 and the hook and loop elements 22b of the second section 10b of the connecting device 10 may also be filled with a sealing material. The sealing material used may, for example, be a resin, in particular a curable resin. The resin may be a cold- or a hot-curable resin, i.e. depending on the intended use of the aircraft assembly 100, a resin introduced into the interspaces present between the hook and loop elements 22a of the first section 10a of the connecting device 10 and the hook and loop elements 22b of the second section 10b of the connecting device 10 may be subjected to a curing process optionally also under elevated temperature and/or elevated pressure in an autoclave.

The connecting device 10 is particularly well suited to the production of hook and loop connections between aircraft structural components subjected to load. For example, the connecting device 10 may be used in the connection of a first aircraft component 12 composed of a fibre-reinforced composite material and in the form of an aircraft outer skin section to second aircraft components 14a-d composed of a fibre-reinforced composite material and in the form of I-beams, Z-holders, Ω-holders or T-beams (see FIGS. 7 and 8). Moreover, a second aircraft component 14e designed in the form of primary insulation of an aircraft may also be connected by means of the connecting device 10 to a first aircraft component 12 forming an aircraft outer skin section, see FIGS. 9 to 13. Furthermore, the connecting device 10 may be used to support a second aircraft component 14f configured in the form of a cable carrier or a hydraulic line carrier, see FIGS. 11 and 12.

Finally, as shown in FIG. 13, it is possible to lay cables 32 in interspaces present between the hook and loop elements 22a of the first section 10a of the connecting device 10 and the hook and loop elements 22b of the second section 10b of the connecting device 10. This enables continuous, abrasion-free cable fixing. Moreover, the connecting device 10 may be used to dissipate heat from the cables 32.

Irrespective of the form of the aircraft components 12, 14a-f of the aircraft assembly 100, the connecting device 10 enables simple compensation of aircraft component tolerances, so that in the aircraft assembly 100 the aircraft components 12, 14a-f are connected to one another in a stress-free manner.

The invention claimed is:

1. An aircraft assembly comprising:
a first aircraft component and a second aircraft component, at least one of the aircraft components being composed of a fibre-reinforced composite material; and
a connecting device connecting the first aircraft component to the second aircraft component, the connecting device comprising:
a first section including a carrier element connected to the first aircraft component and having a first surface facing the first aircraft component and a second surface facing away from the first aircraft component, and a plurality of hook and loop elements extending from the second surface of the carrier element; and
a second section including a carrier element connected to the second aircraft component and having a first surface facing the second aircraft component and a second surface facing away from the second aircraft component, and a plurality of hook and loop elements extending from the second surface of the carrier element, the hook and loop elements of the first and the second section of the connecting device cooperating to produce a hook and loop connection between the first and the second aircraft component,
wherein at least one of the carrier element of the first section of the connecting device and the carrier element of the second section of the connecting device comprises a woven fabric or a laid scrim of reinforcing fibres and is integrated into the aircraft component material of the aircraft component to which the at least one carrier element is connected.

2. The aircraft assembly according to claim 1, wherein at least some of the plurality of hook and loop elements of at least one of the first and second sections of the connecting device comprises hooked, spherical, ellipsoidal or cuboidal hook and loop heads at their free ends facing away from at least one of the second surface of the carrier element of the first section of the connecting device and the second surface of the carrier element of the second section of the connecting device.

3. The aircraft assembly according to claim 1, wherein the carrier element of the first section of the connecting device is composed of a fibre-reinforced composite material.

4. The aircraft assembly according to claim 1, wherein the carrier element of the second section of the connecting device is composed of a fibre-reinforced composite material.

5. The aircraft assembly according to claim 1, wherein the carrier element of the first and second sections of the connecting device is composed of the same fibre-reinforced composite material as the first and second aircraft components, respectively.

6. The aircraft assembly according to claim 3, wherein the carrier element of the first section of the connecting device is connected to the first aircraft component by curing.

7. The aircraft assembly according to claim 4, wherein the carrier element of the second section of the connecting device is connected to the second aircraft component by curing.

8. The aircraft assembly according to claim 1, wherein at least one of the hook and loop elements of the first section of the connecting device and the hook and loop elements of the second section of the connecting device are composed of an electrically conductive material.

9. The aircraft assembly according to claim 1, further comprising interspaces present between the hook and loop elements of the first section of the connecting device and the hook and loop elements of the second section of the connecting device, wherein the interspaces are filled with a sealing material.

10. The aircraft assembly according to claim 9, wherein the sealing material is a curable resin.

11. The aircraft assembly according to claim 1, wherein cables are arranged in interspaces present between the hook and loop elements of the first section of the connecting device and the hook and loop elements of the second section of the connecting device.

12. A method for producing an aircraft assembly comprising:
connecting a first aircraft component to a carrier element of a first section of a connecting device such that a first surface of the carrier element faces the first aircraft component and a second surface of the carrier element faces away from the first aircraft component, a plurality of hook and loop elements extending from the second surface of the carrier element;
connecting a second aircraft component to a carrier element of a second section of the connecting device such that a first surface of the carrier element faces the second aircraft component and a second surface of the carrier element faces away from the second aircraft component, a plurality of hook and loop elements extending from the second surface of the carrier element, and at least one of the aircraft components being composed of a fibre-reinforced composite material, wherein at least one of the carrier element of the first section of the connecting device and the carrier element of the second section of the connecting device comprises a woven fabric or a laid scrim of reinforcing fibres and is integrated into the aircraft component material of the aircraft component to which the at least one carrier element is connected; and
producing a hook and loop connection between the first and the second aircraft components by engaging the hook and loop elements of the first and the second section of the connecting device.

13. The method according to claim 12, wherein the carrier element of the first section of the connecting device is produced from a fibre prepreg which comprises the same materials as the first aircraft component.

14. The method according to claim 12, wherein the carrier element of the second section of the connecting device is produced from a fibre prepreg which comprises the same materials as the second aircraft component.

15. The method according to claim 13, further comprising contacting the carrier element of the first section of the connecting device in the uncured state with the first aircraft component likewise in the uncured state; and producing the connection between the carrier element of the first section of the connecting device and the first aircraft component by joint curing of the carrier element of the first section of the connecting device and of the first aircraft component.

16. The method according to claim 14, further comprising contacting the carrier element of the second section of the connecting device in the uncured state with the second aircraft component likewise in the uncured state; and produducing the connection between the carrier element of the second section of the connecting device and the second aircraft component by joint curing of the carrier element of the second section of the connecting device and of the second aircraft component.

17. The method according to claim 12, wherein at least one of the hook and loop elements of the first section of the connecting device and the hook and loop elements of the second section of the connecting device are produced from an electrically conductive material.

18. The method according to claim 12, further comprising filling interspaces present between the hook and loop elements of the first section of the connecting device and the hook and loop elements of the second section of the connecting device with a sealing material.

19. The method according to claim 18, wherein the sealing material is a curable resin.

20. The method according to claim 12, further comprising laying cables in interspaces present between the hook and loop elements of the first section of the connecting device and the hook and loop elements of the second section of the connecting device.

21. The method according to claim 12, further comprising producing at least one of the first and the second section of the connecting device with a mould made of a water-soluble material.

22. The method according to claim 21, further comprising washing the mould after the first section of the connecting device has been connected to the first aircraft component or the second section of the connecting device has been connected to the second aircraft component.

\* \* \* \* \*